(12) United States Patent
Thimirachandra

(10) Patent No.: US 10,317,194 B2
(45) Date of Patent: Jun. 11, 2019

(54) ARRANGEMENT FOR, AND METHOD OF, REMOTELY DIMENSIONING GENERALLY PLANAR, TARGET SURFACES OF OBJECTS

(71) Applicant: SYMBOL TECHNOLOGIES, LLC, Lincolnshire, IL (US)

(72) Inventor: Sanjeewa Thimirachandra, Kotugoda (LK)

(73) Assignee: Symbol Technologies, LLC, Holtsville, NY (US)

( * ) Notice: Subject to any disclaimer, the term of this patent is extended or adjusted under 35 U.S.C. 154(b) by 176 days.

(21) Appl. No.: 15/235,248

(22) Filed: Aug. 12, 2016

(65) Prior Publication Data

US 2018/0045505 A1  Feb. 15, 2018

(51) Int. Cl.
| | |
|---|---|
| *H04N 7/18* | (2006.01) |
| *G01B 11/22* | (2006.01) |
| *G01B 11/02* | (2006.01) |
| *H04N 5/225* | (2006.01) |
| *H04N 5/335* | (2011.01) |

(Continued)

(52) U.S. Cl.
CPC ............ *G01B 11/024* (2013.01); *G01B 11/25* (2013.01); *G01C 3/08* (2013.01); *G01S 7/4802* (2013.01); *G01S 17/42* (2013.01); *G01S 17/89* (2013.01); *H04N 5/2256* (2013.01); *H04N 5/2258* (2013.01); *H04N 5/335* (2013.01)

(58) Field of Classification Search
CPC .. G01B 11/024; H04N 5/2256; H04N 5/2258; H04N 5/335
See application file for complete search history.

(56) References Cited

U.S. PATENT DOCUMENTS

| | | | |
|---|---|---|---|
| 9,286,530 B2 * | 3/2016 | Moed | G06K 9/2027 |
| 2013/0293684 A1 * | 11/2013 | Becker | G01B 11/245 |
| | | | 348/47 |

(Continued)

FOREIGN PATENT DOCUMENTS

| | | |
|---|---|---|
| EP | 2728306 A1 | 5/2014 |
| WO | 2013/059720 A1 | 4/2013 |

(Continued)

OTHER PUBLICATIONS

International Search Report and Written Opinion for International Patent Application No. PCT/US2017/037014 dated Sep. 1, 2017.

*Primary Examiner* — Jessica M Prince

(74) *Attorney, Agent, or Firm* — Yuri Astvatsaturov

(57) ABSTRACT

Spaced-apart light spots are projected in a light pattern on a target surface lying in a target plane. A range spot is projected at a position on the target surface to find a target distance to the target surface. An image of the target surface, light pattern, and range spot is captured along an imaging axis that is perpendicular to an imager plane of an imager. A controller determines an angular relationship between the imager and target planes based on the light pattern in the captured image, determines a scale relationship between the target surface and the imager based on the position of the range spot in the captured image, displays a compensated image of the target surface that is corrected in tilt by the angular relationship and in scale by the scale relationship, and determines dimensions of the target surface based on dimensions of the displayed compensated image.

16 Claims, 6 Drawing Sheets

(51) Int. Cl.
*G01C 3/08* (2006.01)
*G01S 17/42* (2006.01)
*G01S 17/89* (2006.01)
*G01B 11/25* (2006.01)
*G01S 7/48* (2006.01)

(56) References Cited

U.S. PATENT DOCUMENTS

2014/0307086 A1* 10/2014 Ota ........................ G01B 11/02
348/137
2015/0176987 A1 6/2015 Thimirachandra et al.

FOREIGN PATENT DOCUMENTS

WO WO 2013/059720 A1 * 4/2013
WO WO-2013/059720 A1 * 4/2013

* cited by examiner

ARRANGEMENT FOR, AND METHOD OF, REMOTELY DIMENSIONING GENERALLY PLANAR, TARGET SURFACES OF OBJECTS

BACKGROUND OF THE INVENTION

The present disclosure relates generally to an arrangement for, and a method of, remotely dimensioning generally planar, target surfaces of diverse objects, such as packages and like freight to be shipped, and, in general, for dimensioning any two-dimensional shape or surface lying in a target plane.

It is generally known in the shipping industry to dimension generally planar, target surfaces of packages and like freight since the recipients of the freight are typically charged by the dimensions of the freight, among other factors, such as weight. Knowing the dimensions of the freight is also useful for determining the order in which the freight is to be loaded onto a transport vehicle, and to fill as much of the transport vehicle as possible for efficient handling and distribution. To that end, it is known for the freight to be delivered to a dimensioning station while a set of overhead laser scanners with rangefinders are moved above and past the freight over a time period during which the freight is scanned, and range information from the freight is captured. The range information is then processed by processing equipment to obtain the dimensions of the freight. Although generally useful, this known dimensioning apparatus has not proven to be altogether satisfactory in practice due to the high cost of the scanners and associated processing equipment, as well as the relatively lengthy time period required to scan the freight.

As another example, for example, in the home improvement industry, it is desirable to know the dimensions of such generally planar, target surfaces as room walls in order to determine how much paint or wallpaper will be needed to cover the walls. Mentally estimating how much paint or wallpaper is required for a home improvement job is a task that plagues many do-it-yourselfers.

Accordingly, it would be desirable to dimension the generally planar, target surfaces of many diverse objects in a more cost-effective, expeditious, and accurate manner.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
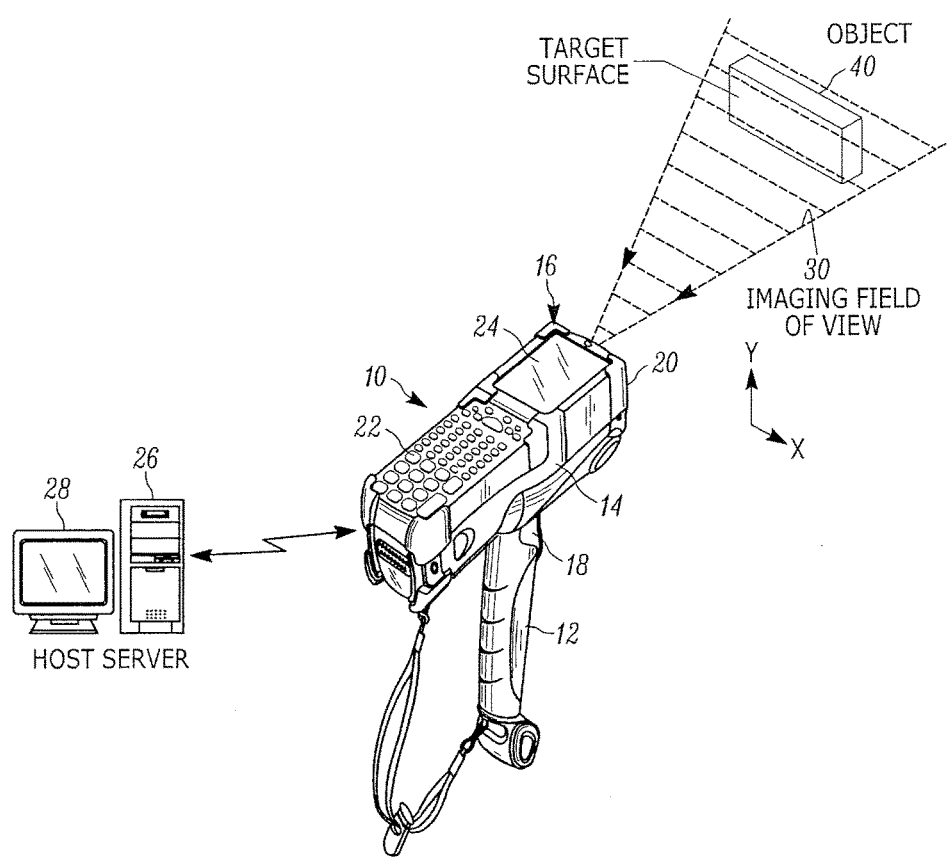
FIG. 1 is a perspective view of an arrangement for remotely dimensioning a generally planar, target surface of one type of object in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for remotely dimensioning a generally planar, target surface of an object, e.g., a package or like freight to be shipped, or a room wall, or, in general, any one or more two-dimensional shapes or surfaces lying in a target plane. The arrangement includes a light pattern assembly for projecting a plurality of light spots that are spaced apart in a light pattern on the target surface. Preferably, the light pattern assembly includes a laser source for emitting a main laser beam along a laser axis, and a beam splitter, such as a diffractive optical element (DOE) or a refractive optical element (ROE), for splitting the main laser beam into a plurality of split laser beams that diverge apart away from the laser source and that extend at known angles away from the laser axis. The split laser beams impinge on the target surface as the light spots.

The arrangement further includes a rangefinder assembly for projecting a range light spot at a position on the target surface to find a target distance to the target surface. Preferably, the rangefinder assembly includes a ranging laser for emitting a ranging laser beam along a ranging axis to form the range spot on the target surface.

The arrangement still further includes an imaging assembly for capturing an image of the target surface, the light pattern, and the range spot over a field of view along an imaging axis. The imaging assembly includes an imager having an array of sensors lying in an imager plane that is generally perpendicular to the imaging axis. Preferably, the imager is a charge coupled device (CCD) or a complementary metal oxide semiconductor (CMOS) device. Advantageously, a lens assembly projects the captured image onto the array.

The arrangement yet further includes a controller, e.g., a programmed microprocessor, for determining an angular relationship between the imager plane and the target plane based on the light pattern in the captured image. For example, the light spots are generally equidistantly spaced apart when the imager plane and the target plane are generally parallel to each other, and are non-equally spaced apart when the imager plane and the target plane are inclined or tilted relative to each other. The controller also determines a scale relationship between the target surface and the imager based on the position of the range spot in the captured image, displays a compensated image of the target surface that is corrected in tilt by the determined angular relationship and in scale by the determined scale relationship, and determines the dimensions of the target surface based on the dimensions of the displayed compensated image.

A further aspect of this disclosure is directed to a method of remotely dimensioning a target surface lying in a target plane of an object. The method is performed by projecting a plurality of light spots that are spaced apart in a light pattern on the target surface; by projecting a range light spot at a position on the target surface to find a target distance to the target surface; by capturing an image of the target surface, the light pattern, and the range spot over a field of view along an imaging axis of an imager having an array of sensors lying in an imager plane that is generally perpendicular to the imaging axis; by determining an angular relationship between the imager plane and the target plane based on the light pattern in the captured image; by determining a scale relationship between the target surface and the imager based on the position of the range spot in the captured image; by displaying a compensated image of the target surface that is corrected in tilt by the determined angular relationship and in scale by the determined scale relationship; and by determining dimensions of the target surface based on dimensions of the displayed compensated image.

Figure 6:
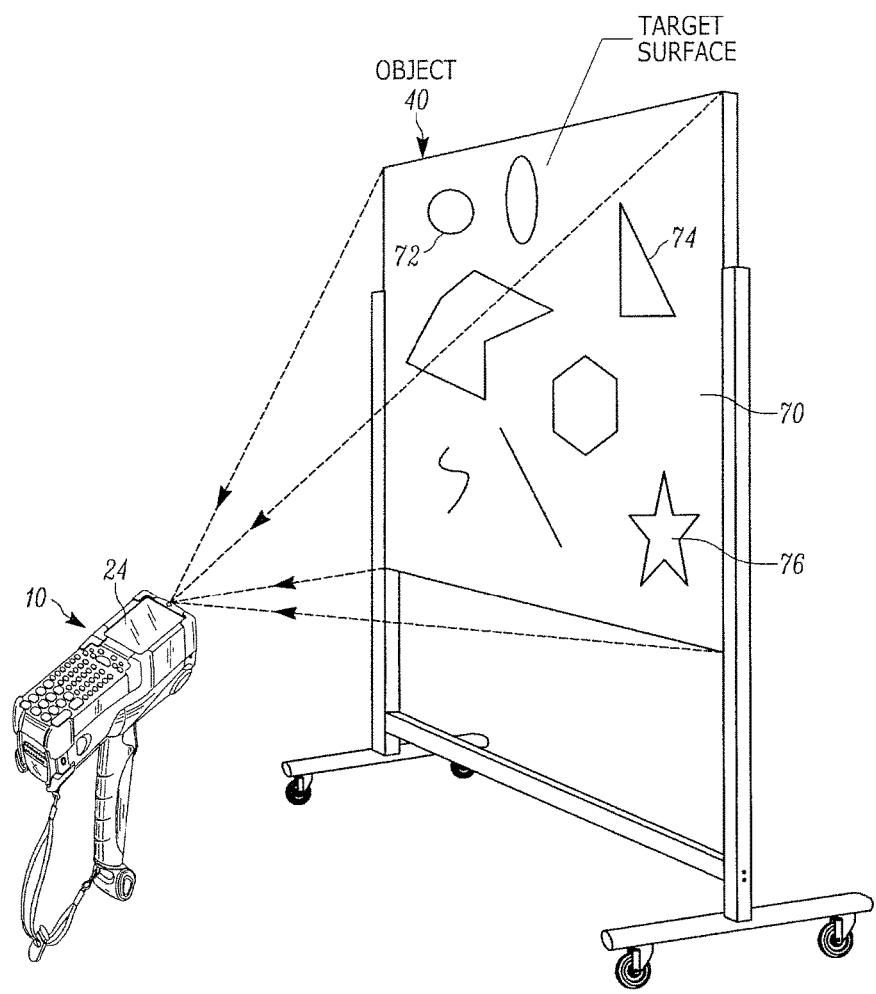
FIG. 6 is a perspective view of an arrangement for remotely dimensioning a generally planar, target surface of another type of object, including individual shapes, in accordance with this disclosure.
Figure 7:
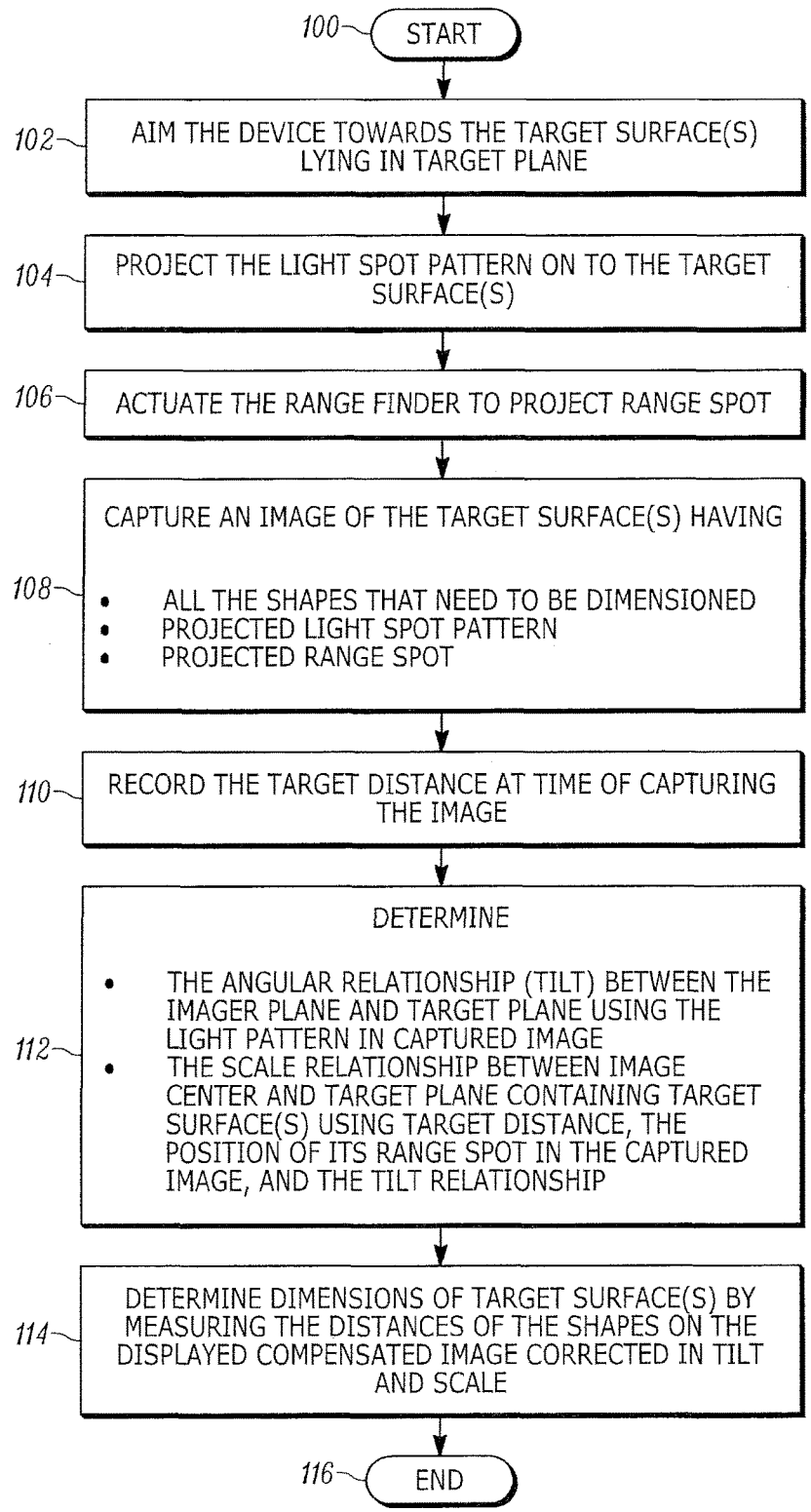
FIG. 7 is a flow chart depicting a method in accordance with this disclosure.

Turning now to the drawings, reference numeral 10 in FIG. 1 generally identifies a device for dimensioning at least one, generally planar, outer target surface lying in a target plane of an object or target 40. As illustrated, the device 10 is a mobile, handheld device that has a lower handle 12 to be gripped in an operator's hand, and also has an upper barrel 14 arranged in a gun-shaped housing 16 with an actuatable trigger 18 that is manually depressed and actuated by the operator's forefinger to initiate dimensioning of each target surface of the object 40, as described below. The object 40 can be any object. In FIG. 1, the object 40 has been illustrated as a generally flattened, parallepiped package or parcel of freight to be shipped, and the target surface is the exterior side of the package that faces the device 10. In FIG. 6, the object 40 has been illustrated as a generally planar whiteboard 70. Alternatively, the object 40 can be one or more of the various shapes, figures, or diagrams 72, 74, 76 that are presented on the whiteboard 70. The object can, in general, be any two-dimensional surface or structure, for example, a room wall. A light-transmissive window 20 (best seen in FIG. 2) is mounted on the housing 16 at the front end region of the barrel 14. A keyboard 22 with numeric, alphabetic and function keys for manual data/function entry is mounted on the housing 16 within ready manual access to the operator. A touch screen or display 24 is also mounted on the housing 16 within ready visual access to the operator for visually displaying images/prompts/device information to the operator.

The mobile device 10 is operatively connected, either by a wired or wireless connection, to a host server 26 that has a display monitor 28. The server 26 is preferably a local computer, but can also be a remote cloud server. The server 26 may include a wireless RF transceiver that communicates with the device 10. For example, Wi-Fi and Bluetooth® are open wireless standards for exchanging data between electronic devices. The mobile device 10 can thus be used in a handheld mode in which it is aimed at each object 40 having a target surface to be dimensioned, followed by manual depression of the trigger 18 to initiate the dimensioning. Although the illustrated mobile device 10 has been shaped and configured as a handheld device, it will be understood that this is merely exemplary, because the device 10 can have myriad other shapes and configurations including, but not limited to, stationary presentation workstations in which the device 10 is fixed in a predetermined position, for example, by being remotely mounted overhead away from the object 40.

Figure 2:
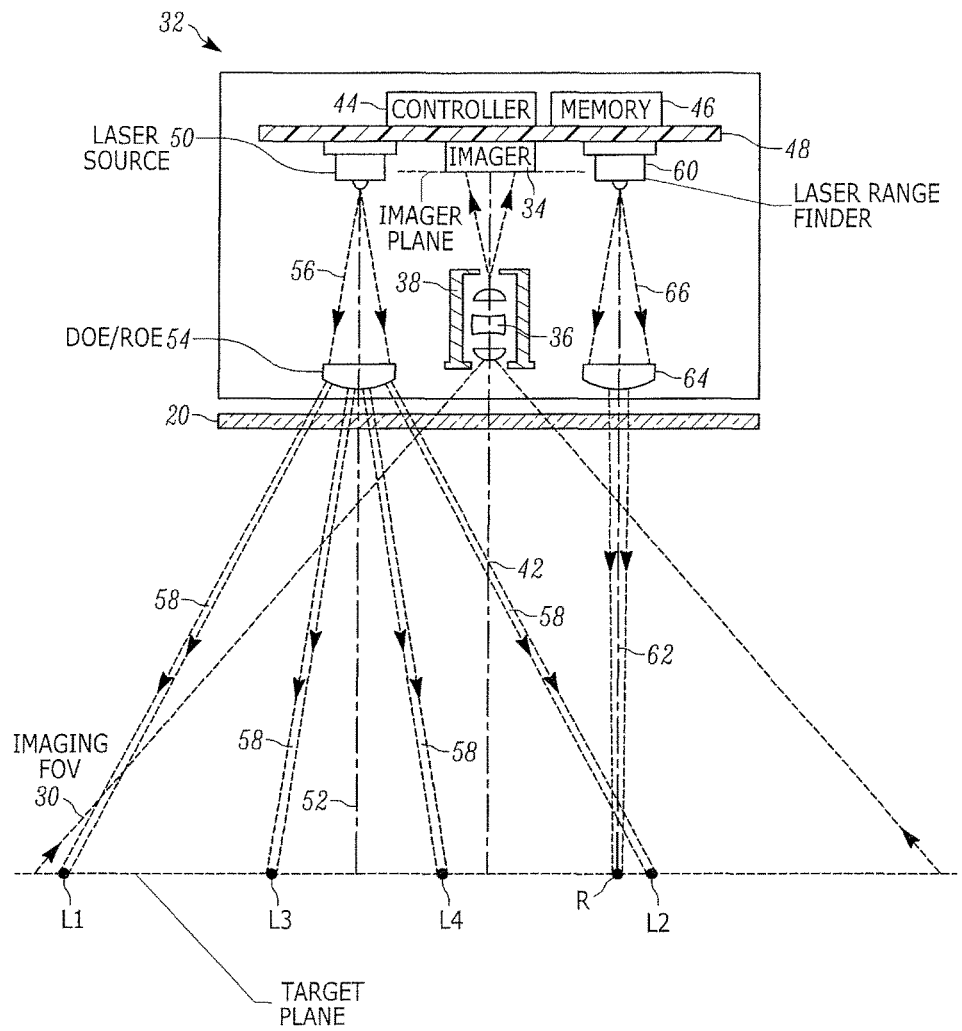
FIG. 2 is an enlarged, schematic view of an imaging assembly, a light pattern assembly, and a rangefinder assembly for use in the arrangement of FIG. 1.

FIG. 2 schematically depicts a support or module 32 mounted in the device 10 behind the window 20. The module 32 includes an imaging assembly having a solid-state imager 34, and an imaging lens assembly 36 mounted in a tubular holder 38 that has a circular imaging exit aperture. The imager 34 is a two-dimensional, charge coupled device (CCD) array or a complementary metal oxide semiconductor (CMOS) device having an array of cells or sensors with either a global or a rolling shutter. The two-dimensional array of sensors lies in an imager plane. The imager 34 and the imaging lens assembly 36 are preferably optically aligned along a centerline or an optical imaging axis 42 generally centrally located within the barrel 14. The imager plane is generally perpendicular to the imaging axis 42.

In operation, the imaging assembly captures return light passing through the window 20 along the imaging axis 42 centered in an imaging field of view 30 of the imaging lens assembly 36 from the target 40 located remotely in a range of working distances away from the window 20. The imager 34 is advantageously positioned closer to a rear wall of the barrel 14 than to a front of the housing in order to enlarge the imaging field of view 30 in the near range of working distances close to the window 20. The imaging lens assembly 36 preferably comprises one or more fixed-focus lenses, preferably a Cooke triplet, for focusing and imaging the target 40 onto the imager plane. The field of view 30 is generally rectangular and extends along the illustrated mutually orthogonal, horizontal (X) and vertical (Y) axes that are generally perpendicular to the imaging axis 42.

The sensors produce electrical signals corresponding to a two-dimensional array of pixel information for an image of the target 40. The electrical signals are processed by a controller or programmed microprocessor 44 into data indicative of the dimensions of the target 40. The controller 44 is connected to a memory 46 for data retrieval and storage. The controller 44 and the memory 46 are mounted on a printed circuit board 48, which need not be mounted in the module 32 as shown, but could be mounted remotely from the module 32. The imaging assembly is capable of acquiring a full image of the target 40 under various lighting conditions. A non-illustrated illumination system may also be mounted on the module 32 to provide illumination light to illuminate the target 40. Exposure time is controlled by the controller 44. Resolution of the array can be of various sizes. A VGA resolution of 640×480 pixels may be used to minimize cost. A higher resolution will provide a higher pixel accuracy and, in turn, a more accurate dimensioning result as described below.

A light pattern assembly is also mounted in the module 32 for projecting a plurality of light spots L1, L2, L3, L4 (see FIGS. 2-5) that are spaced apart in a light pattern on the target surface of the target 40. Preferably, the light spots are generally circular dots of light. The light pattern assembly is slightly laterally offset, as close as possible by a known radial spacing, away from the imaging assembly and includes a laser source 50 for emitting a main laser beam 56 along a laser axis 52, and a beam splitter 54, such as a diffractive optical element (DOE) or a refractive optical element (ROE), for splitting the main laser beam 56 into a plurality of split laser beams 58 that diverge apart away from the laser source 50 along both the X and Y axes and that extend at known angles away from the laser axis 52. The split laser beams 58 impinge on the target surface as the light spots L1, L2, L3, L4 in the target plane. Although four split laser beams 58 have been illustrated, it will be understood that three or more split laser beams 58 are contemplated by this disclosure. Although a DOE/ROE 54 has been illustrated as the beam splitter, it will be understood that the main laser beam 56 could also be split by an optical system comprised of prisms and/or lenses and/or field mirrors and like optical elements.

A rangefinder assembly is also mounted in the module 32 for finding a target distance between the imager 34 and the target surface. The rangefinder assembly is also slightly laterally offset, as close as possible by a known radial spacing, away from the imaging assembly and includes a ranging laser 60 for emitting a ranging laser beam 66 along a ranging axis 62, and a focusing lens 64 to form a range spot R at a position on the target surface within the field of view 30. The imager 34 captures an image not only of the target surface, but also of the light pattern, as well as of the range spot. The position of the range spot R in the captured image is indicative of the target distance.

Figure 3:
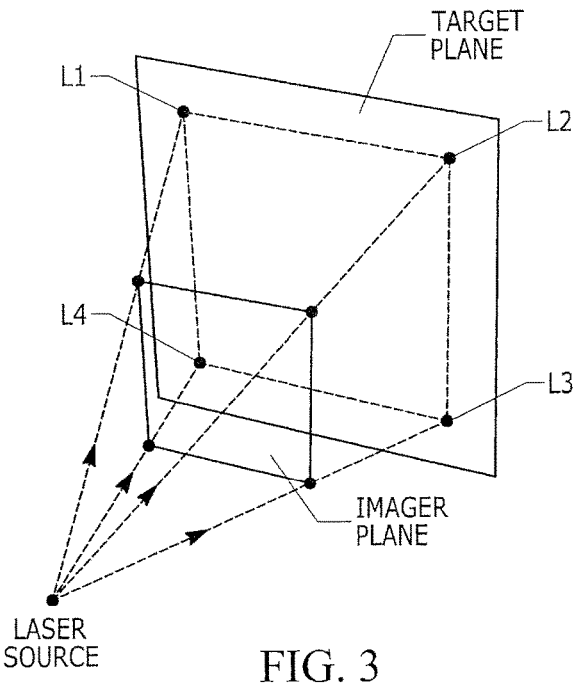
FIG. 3 is a perspective, schematic view of an exemplary light pattern produced when an imager plane of the imaging assembly of FIG. 2 is substantially parallel to a target plane of the object.
Figure 4:
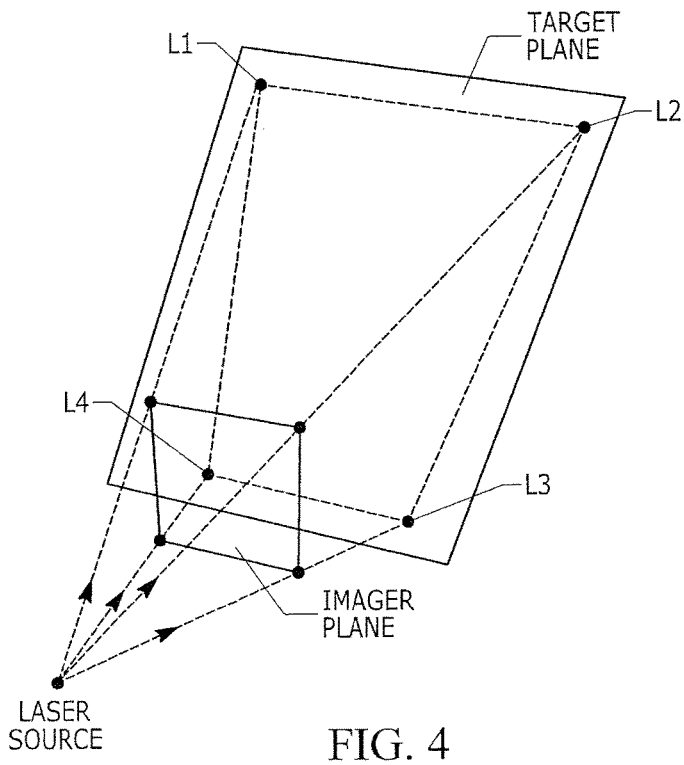
FIG. 4 is a view analogous to FIG. 3, but of the light pattern produced when the imager plane is inclined or tilted relative to the target plane along a horizontal axis.
Figure 5:
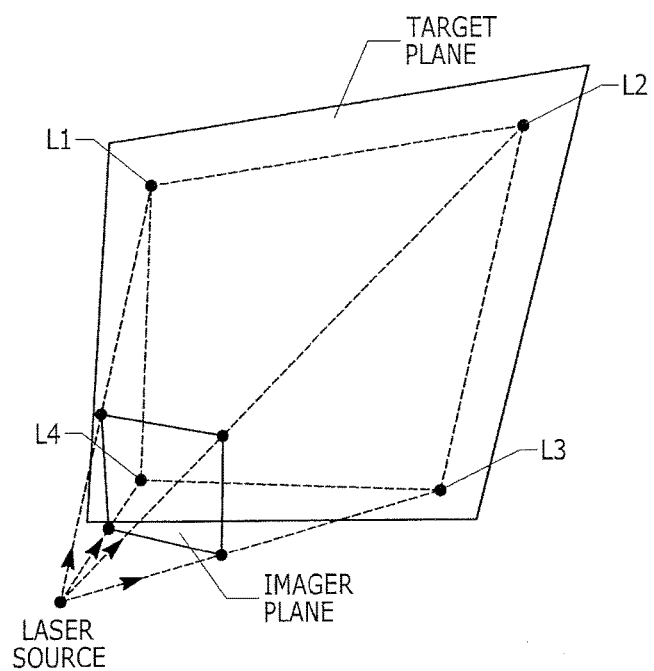
FIG. 5 is a view analogous to FIG. 3, but of the light pattern produced when the imager plane is inclined or tilted relative to the target plane along both horizontal and vertical axes.

The aforementioned controller 44 is also operative for determining an angular relationship between the imager plane and the target plane based on the light pattern in the captured image. For example, as shown in FIG. 3, the light spots L1, L2, L3, L4 are generally equidistantly spaced apart and form a square in the target plane, and this angular relationship indicates that the imager plane and the target plane are generally parallel to each other, as depicted in FIG. 3. As shown in FIG. 4, the light spots L1, L2, L3, L4 are non-equidistantly spaced apart and form a trapezoid in the target plane, and this angular relationship indicates that the imager plane and the target plane are generally inclined or tilted relative to each other about the X axis, as depicted in FIG. 4. As shown in FIG. 5, the light spots L1, L2, L3, L4 are non-equidistantly spaced apart and form a skewed, non-trapezoid in the target plane, and this angular relationship indicates that the imager plane and the target plane are generally inclined or tilted relative to each other about both the X axis and the Y axis, as depicted in FIG. 5. Although four light spots have been illustrated in FIGS. 2-5, it will be understood that three light spots could be used, in which case, the three light spots would form an equilateral triangle when the imager plane and the target plane are generally parallel to each other, or five or more light spots could be used, in which case, the five or more light spots would form an equiangular polygon when the imager plane and the target plane are generally parallel to each other. In operation, the controller 44 can determine the tilt or angle between the imager plane and the target plane by noting the positions of, and the spacings among, the light spots relative to one another in the image captured by the imager 34.

The controller 44 is also operative for determining a scale relationship between the target surface and the imager 34 based at least in part on the position of the range spot R in the captured image. The target distance to the target surface divided by the radial spacing between the axes 42 and 62 is proportional to the axial spacing between the lens assembly 36 and the imager 34 divided by the radial offset distance of the position of the range spot R in the imager plane. Thus, the target distance found by the rangefinder assembly is used by the controller 44 as a scale or zoom factor. The controller 44 displays a compensated image of the target surface on the display 24. The compensated image is corrected in tilt by the determined angular relationship and in scale by the determined scale relationship. The controller 44 determines the dimensions of the target surface based on the dimensions of the displayed compensated image.

As described, the two mutually orthogonal dimensions, e.g. length and width, of the generally planar target surface depicted in FIG. 1 can be determined. From these dimensions, other factors, such as area, the object perimeter, radii, etc., can be calculated. The device 10 can image other target surfaces of the object 40 to determine the volume of the object 40. Any object 40 having generally planar, target surfaces can be dimensioned. The object 40 need not be shaped as a generally flattened, parallelepiped box as illustrated in FIG. 1, but can have any shape. For example, FIG. 6 depicts a whiteboard 70 having different two-dimensional shapes, i.e., a circle 72, a triangle 74, and a five-pointed star 76, and so on. Any or all of these shapes 72, 74, 76 can be dimensioned, either each in their respective turn, or all simultaneously by actuation of the trigger 18. The dimensions of the entire whiteboard 70 itself can be determined. Instead of the whiteboard 70, one or more room walls can be dimensioned, which, as noted above, is useful when ordering paint or wallpaper for a home improvement job.

As shown in the flow chart of FIG. 6, the method of remotely dimensioning a generally planar, target surface of the object 40 is performed in a series of steps. Starting with start step 100, the mobile device 10 is initially aimed at the target surface lying in a target plane in step 102. In step 104, the laser source 50 is actuated by depression of the trigger 18 in order to project the plurality of the light spots L1, L2, L3, L4 in a spaced-apart light pattern on the target surface. In step 106, the rangefinder 60 is also actuated by depression of the trigger 18 in order to project the range spot R on the target surface. In step 108, the imager 34 captures an image over the field of view 30 along the imaging axis 42, with an array of imaging sensors lying in an imager plane that is generally perpendicular to the imaging axis 42. The captured image includes the spaced-apart light pattern, the range spot R, and the target surface. As previously mentioned, the target surface may be an entire surface, such as a room wall or a whiteboard, or may include one or more shapes or surfaces on the target surface that need to be individually dimensioned. In step 110, the controller 44 determines and records the target distance at the time that the image was captured.

In step 112, the angular relationship or tilt between the imager plane and the target plane is determined by the controller 44 based on the light pattern in the captured image. In addition, the controller 44 determines a distance relationship or scale between a center of the captured image and the target plane using the target distance, the position of the range spot in the captured image, and the tilt relationship. In step 114, the dimensions of the target surface are determined based on the determined tilt relationship and the determined scale relationship. The controller 44 causes a compensated image to be displayed on the display 24. The compensated image is corrected both in tilt by the determined angular relationship and in scale by the determined scale relationship. The dimensions of the actual target surface/object may be determined from the dimensions of the compensated image.

In summary, the instant arrangement captures an image and finds tilt and scale information about the target surface to be dimensioned. The tilt- and scale-compensated (adjusted) image is then displayed on the display 24 on the mobile device 10. The operator may use a stylus (or his/her finger) to trace and demarcate any shape(s) or zone(s) in the compensated image whose dimensions, e.g., area, length, width, perimeter, radius, etc. are to be determined in step 114. Preferably, the display 24 is configured as a touch screen so that the controller 44 knows which zones have been outlined by the moving stylus (finger). For example, after obtaining a tilt- and scale-compensated (adjusted) image of a room wall, and then demarcating certain areas on the compensated image in order to get an area calculation, the operator can decide the amount of paint or wallpaper required to cover the area of the room wall. The operator can either add, or eliminate, certain areas from a main area on the compensated image by demarcation. The method ends at step 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for remotely dimensioning a target surface lying in a target plane of an object, the arrangement comprising:
    a light pattern assembly for projecting a plurality of light spots that are spaced apart in a light pattern on the target surface;
    a rangefinder assembly for projecting a range light spot at a position on the target surface to find a target distance to the target surface;
    an imaging assembly for capturing an image of the target surface, the light pattern, and the range spot over a field of view along an imaging axis, the imaging assembly including an imager having an array of sensors lying in an imager plane that is generally perpendicular to the imaging axis; and
    a controller for determining an angular relationship between the imager plane and the target plane based on the light pattern in the captured image, for determining a scale relationship between the target surface and the imager based on the position of the range spot in the captured image, for displaying a compensated image of the target surface that is corrected in tilt by the determined angular relationship and in scale by the determined scale relationship, and for determining dimensions of the target surface based on dimensions of the displayed compensated image, wherein the light spots are generally equidistantly spaced apart when the imager plane and the target plane are generally parallel to each other, and are non-equally spaced apart when the imager plane and the target plane are inclined relative to each other.

2. The arrangement of claim 1, wherein the imager is one of a charge coupled device (CCD) and a complementary metal oxide semiconductor (CMOS) device, and wherein the imaging assembly includes a lens assembly for projecting the captured image onto the array.

3. The arrangement of claim 1, wherein the light pattern assembly includes a laser source for emitting a main laser beam along a laser axis, and a beam splitter for splitting the main laser beam into a plurality of split laser beams that diverge apart away from the laser source and that extend at known angles away from the laser axis, and wherein the split laser beams impinge on the target surface as the light spots.

4. The arrangement of claim 3, wherein the beam splitter is one of a diffractive optical element (DOE) and a refractive optical element (ROE).

5. The arrangement of claim 1, wherein the rangefinder assembly includes a ranging laser for emitting a ranging laser beam along a ranging axis to form the range spot on the target surface within the field of view.

6. The arrangement of claim 1, and a display on which the compensated image is visually displayed by the controller.

7. The arrangement of claim 6, wherein the display is a touch screen on which zones of the compensated image are demarcated.

8. The arrangement of claim 1, and a support on which the imaging assembly, the light pattern assembly and the rangefinder assembly are supported remotely from the target surface.

9. A method of remotely dimensioning a target surface lying in a target plane of an object, the method comprising:

projecting a plurality of light spots that are spaced apart in a light pattern on the target surface;

projecting a range light spot at a position on the target surface to find a target distance to the target surface;

capturing an image of the target surface, the light pattern, and the range spot over a field of view along an imaging axis of an imager having an array of sensors lying in an imager plane that is generally perpendicular to the imaging axis;

determining an angular relationship between the imager plane and the target plane based on the light pattern in the captured image;

determining a scale relationship between the target surface and the imager based on the position of the range spot in the captured image;

displaying a compensated image of the target surface that is corrected in tilt by the determined angular relationship and in scale by the determined scale relationship; and determining dimensions of the target surface based on dimensions of the displayed compensated image, wherein the light spots are generally equidistantly spaced apart when the imager plane and the target plane are generally parallel to each other, and are non-equally spaced apart when the imager plane and the target plane are inclined relative to each other.

10. The method of claim 9, and configuring the array as one of a charge coupled device (CCD) and a complementary metal oxide semiconductor (CMOS) device, and projecting the captured image onto the array.

11. The method of claim 9, wherein the projecting of the light pattern is performed by emitting a main laser beam along a laser axis, and splitting the main laser beam into a plurality of split laser beams that diverge apart and that extend at known angles away from the laser axis, and wherein the split laser beams impinge on the target surface as the light spots.

12. The method of claim 11, wherein the splitting is performed by one of a diffractive optical element (DOE) and a refractive optical element (ROE).

13. The method of claim 9, wherein the projecting of the range spot is performed by emitting a ranging laser beam along a ranging axis to form the range spot on the target surface within the field of view.

14. The method of claim 9, and visually displaying the compensated image on a display.

15. The method of claim 14, and demarcating zones in the compensated image on the display.

16. The method of claim 9, wherein the capturing, the projecting of the light pattern, and the projecting of the range spot are performed by mounting assemblies on a support remotely from the target surface.

* * * * *